Figure 1:
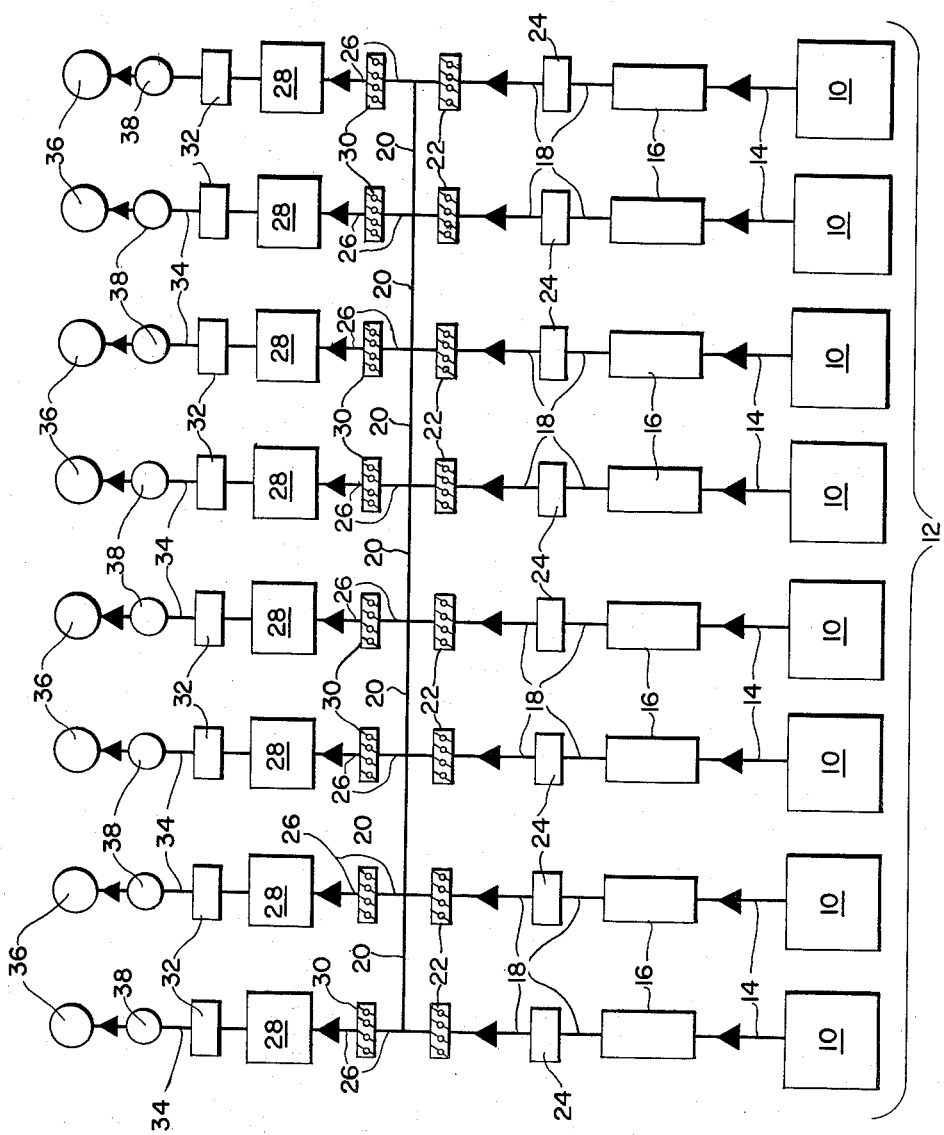

Nov. 13, 1962 V. W. COPCUTT 3,063,219
GAS CLEANING SYSTEM
Filed Feb. 29, 1960 2 Sheets-Sheet 1

INVENTOR
VINCENT W. COPCUTT

BY Harold T. Stowell
Harold L. Stowell

ATTORNEYS

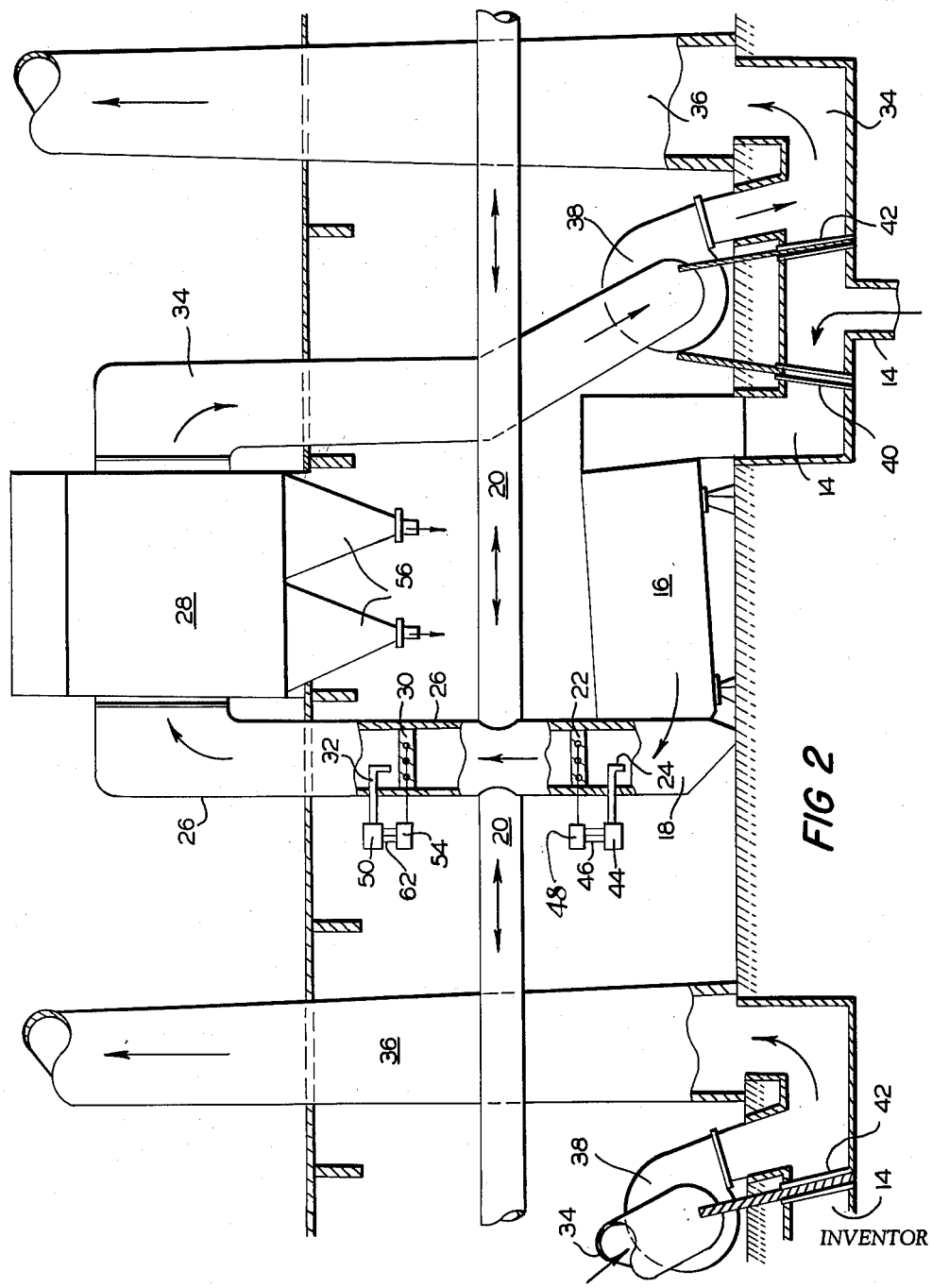

3,063,219
GAS CLEANING SYSTEM

Vincent W. Copcutt, Plainfield, N.J., assignor to Research-Cottrell, Inc., Bridgewater Township, N.J., a corporation of New Jersey
Filed Feb. 29, 1960, Ser. No. 11,598
5 Claims. (Cl. 55—212)

This invention relates to an improved gas cleaning system and, in particular, to a gas cleaning system wherein the gas to be cleaned issues from a plurality of sources each having heat runs consisting of several stages and producing various volumes of gas and wherein the gases, in passing from the plurality of sources to the gas cleaning apparatus, communicate through an equalizing flue.

An object of the present invention is to provide such a system wherein the number of gas cleaning devices may be equal to the number of gas producing furnaces or there may be more or less gas cleaning devices than furnaces.

The system of the present invention also includes draft producing means downstream of the gas equalizing flue so that the draft on each of the plurality of furnaces may be greater or less than the draft produced by any one of the draft producing means.

It is a further object of the present invention to provide such a gas cleaning system for cleaning gases from a plurality of furnaces wherein the capacity of the total gas cleaning installation may be smaller than that required to handle the total peak volume output from the plurality of furnaces.

A further object is to provide such a system wherein the flue and ducting and draft control mechanism is at a minimum substantially reducing the initial installation cost of the system and wherein the total draft producing capacity is at a minimum.

These and other objects and advantages of the present invention are provided in a system for cleaning gases from a plurality of furnaces comprising a plurality of gas cleaning devices, an equalizing flue, flue means connecting each of the furnaces to said equalizing flue, flue means connecting the equalizing flue to the inlet of each of said gas cleaning devices, a separate damper in each of the first and second mentioned flue means, and gas draft means downstream of said equalizing flue.

The invention will be more particularly described with reference to the illustrated embodiments thereof wherein:

FIG. 1 is a diagrammatic view of the system of the present invention for treating gases from eight furnaces; and FIG. 2 is an enlarged fragmentary view of the gas cleaning system of the present invention showing the gas flow path for one furnace installation.

In steel mills, the typical arrangement of open hearth furnaces is to have all of the furnaces aligned in a long row. In such mills a row may consist of from about 10 to about 20 furnaces with all of the furnaces of substantially the same size. The furnaces produce steel in batches or heats and a heat runs about eight hours and consists of a plurality of stages, such as charging, melt-down, fluxing, and boiling. The stages of the heats on the various furnaces are generally staggered, thus permitting, for example, one operating crew to service many furnaces.

The quantity of gas emitted from a furnace will vary according to the heat stage, the average volume from each furnace being from 30% to 85% of the maximum gas emission, depending on the installation and method of operation, a typical average volume being about 70%. The present invention provides a simple, relatively inexpensive system for cleaning the gas issuing from open hearth furnaces with the gas cleaning installation being sized for the average volume rather than the total maximum volume of each of the plurality of open hearth furnaces.

The present invention will be described with reference to FIGS. 1 and 2 of the drawing wherein 10 designates the open hearth furnaces of a row of furnaces 12. Each of the furnaces 10 may be of the type wherein steel is produced in heats and each heat consists of several stages with the stages of the heats on the furnace being staggered and with the quantity of gases emitted from a furnace varying according to its operating stage with the average volume being substantially less than the maximum volume output as hereinabove described.

Each of the furnaces 10 is connected by individual flue means 14 to a waste heat boiler or other gas cooling means of conventional design and generally designated 16 in the drawings. The gas issuing from each of the gas cooling means 16 is connected by flue means 18 to an equalizing flue generally designated 20. The equalizing flue 20 interconnects each of the flues 18 whereby when the gas volume from one furnace is higher than average, the excess gas may flow through the equalizing flue to the gas cleaning apparatus on a lower than average furnace as will be more fully described hereinafter.

In each of the flues 18, connecting the output from each waste heat boiler 16 and the equalizing flue 20, is a gas flow controlling damper means generally designated 22. Each gas flow controlling damper means 22 may be of the motor-controlled type and the position of the dampers of the damper means 22 is controlled by a gas flow or pressure responsive controller generally designated 24 positioned upstream of its damper in each of the flues 18.

A plurality of flues 26 connect the equalizing flue 20 to a plurality of gas cleaning devices 28. In the illustrated form of the invention, there are an equal number of gas cleaning devices and furnaces. Therefore, each flue 26 may be considered as a continuation of its respective flue 18 connecting the outlet from the gas cooling means 16 to the equalizer flue 20. However, it will be apparent to those skilled in the art that the number of gas cleaning devices 28 may be more or less than the number of furnaces 10. When the number of gas cleaning devices is different from the number of furnaces, each gas cleaning device is sized to have a volume capacity approximately equivalent to the average gas volume of each furnace multiplied by the number of furnaces and divided by the number of gas cleaning devices. It is further pointed out that the type of gas cleaning device 28 employed in the system of the present invention is not critical and may comprise electrostatic precipitators; bag filters; vortical gas cleaning apparatus, of the wet or dry type; or various combinations of mechanical separators, particle filters and electrostatic gas cleaning devices, as is well known in the art.

In each of the flues 26 is interposed a second gas flow control damper means generally designated 30 which is preferably of the motor controlled type and which as shown in FIG. 1, is interconnected to gas flow or pressure responsive sensing means 32 positioned in flue means 34 connecting the output side of each of the gas cleaning devices 28 with its respective stack 36.

It will be apparent that while the sensing means 32 are illustrated in FIG. 1 as being downstream of their respective damper means 30 and gas cleaning means 28 that each of the sensing means 32 may be positioned downstream of the damper means 30 and upstream of the gas cleaning means 28, as specifically illustrated in FIG. 2.

Also interposed in the flue means 34, connecting the output from the gas cleaning apparatus 28 and each stack 36, is a draft producing fan means generally designated 38. Each of the fan means 38, where the number of fans is equal to the number of furnaces 10, is sized for the average volume output of its furnace rather than its maximum volume. Since the fan means 38 are downstream of the equalizing flue 20 the output of the fans 38 is apportioned to the furnaces 10 in accordance with their needs as determined by the stage of the heat and as controlled by the sensing means 24 regulating the position of the dampers of flow controlling damper means 22.

The form of the sensing means 24 and 32 and the motor means interconnectng their respective dampers does not form a part of the present invention and any suitable sensing and control means may be employed in the system of the present invention. However, satisfactory results may be obtained with the sensing means disclosed in U.S. Patent 2,650,497, R. A. Renwanz, granted September 1, 1953, and the flow sensing and control system disclosed in U.S. Patent 2,867,285, H. A. Wintermute, granted January 6, 1959.

Further, it will be apparent to those skilled in the art that while particular control devices have been specifically referred to, it is to be understood that such devices are for purposes of illustration only.

In FIG. 2, a typical embodiment of the system of the present invention applied to an open hearth steel plant is illustrated. In FIG. 2, structures corresponding to those diagrammatically illustrated in FIG. 1 have been given corresponding reference numerals. In FIG. 2, the open hearth furnaces, not illustrated, are connected by flue structures 14 to their respective waste heat boilers 16. In the flue sections 14 are provided a pair of manually controllable dampers 40 and 42. In normal operation of the system, dampers 42 are closed and dampers 40 are opened so that gases issuing from the furnaces 10 pass through conduits 14, the gas cooling means 16, the gas cleaning apparatus 28 and out the stacks 36. However, by means of the dampers 40 and 42, all of the gas from one or more furnaces may bypass its gas cooling means and gas cleaning equipment and pass directly out of its stack 36. Further, as illustrated in FIG. 2 of the drawings, the sensing means 24 in each flue 18 is connected to a control device 44 which is connected by conductors 46 to motor means 48 for actuating the dampers of the damper means 22. Similarly, the sensing means 32 in each flue section 26 is connected to a control device 50 which is connected by conductor means 52 to a motor 54 for controlling the dampers of damper means 30.

Also, as illustrated in FIG. 2, the gas cleaning apparatus 28 is provided with a pair of particulate material storing hoppers 56 which receive the suspended particles removed from the gas stream passing through the gas cleaning apparatus.

The following is a typical example of the operation of the present invention as applied to a row of open hearth furnaces. Each of the furnaces operate on staggered heats, permitting one operating crew to service many furnaces. The quantity of gas emitted from each furnace varies according to its stage in the heat. The gas cleaning structures 28 comprise electrostatic precipitators and the draft means comprise electric motor driven fans. The fans 38 and the electrostatic precipitators 28 are designed to have a capacity approximately equal to the average gas volume of a furnace. The dampers 30 are regulated by sensing means 32 to direct a gas volume to each electrostatic precipitator 28 at approximately its rated volume and the flow controlling dampers 22 are actuated by the sensing means 24 to maintain the required draft on the individual furnaces 10 determined by the particular stage in the heat of the steel producing process of the furnace. Thus, when a furnace volume is higher than average or the approximate rated volume of a gas cleaner 28 or its respective fan 38, the excess gases issuing from that furnace above the rated volume of the gas cleaning equipment will flow through the equalizing flue 20 to a gas cleaner 28 and fan 38 on a lower than average gas emitting furnace 10. Thus, each of the gas cleaning precipitators 28 will clean its share of the total gas load on the system regardless of the heat stage at which its associated furnace is operating.

Having described the improved process of the present invention with reference to a diagrammatic system and in reference to a structural embodiment of the means for carrying out the system, it will be apparent to those skilled in the art that the present invention fully accomplishes the aims and objects hereinbefore set forth and that various modifications may be made therein without departing from the scope of the appended claims.

I claim:

1. A system for cleaning gases from a plurality of furnaces comprising a plurality of gas cleaning devices, an equalizing flue, first individual flue means connecting each of the furnaces to said equalizing flue, second individual flue means connecting said equalizing flue to the inlet of each of said gas cleaning devices, a separate gas flow controlling damper in each of said first and second individual flue means and gas draft means connected to each of said second individual flue means.

2. A system for cleaning gases from a plurality of metallurgical furnaces comprising a plurality of gas cleaning devices, an equalizing flue, first individual flue means connecting each of the furnaces to said equalizing flue, second individual flue means connecting said equalizing flue to the inlet of each of said gas cleaning devices, a separate flow controlling damper in each of said first and second individual flue means, and gas draft means connected to the outlet of each of said gas cleaning devices.

3. A system for cleaning gases from a plurality of furnaces comprising a plurality of gas cleaning devices, an equalizing flue, first individual flue means connecting each of the furnaces to said equalizing flue, second individual flue means connecting said equalizing flue to the inlet of each of said gas cleaning devices, a separate flow controlling damper in each of said first and second individual flue means, gas sensing means in each of said first and second individual flue means, means connecting each of said gas flow sensing means to its respective gas flow damper, and gas draft means connected to each of said second individual flue means.

4. The invention defined in claim 2 wherein the number of furnaces and the number of gas cleaning devices is equal.

5. The invention defined in claim 2 wherein each of the furnaces is substantially identical in form and comprises an open hearth furnace.

References Cited in the file of this patent
UNITED STATES PATENTS

| | | |
|---|---|---|
| 1,541,650 | Matheson | June 9, 1925 |
| 2,609,063 | Francis | Sept. 2, 1952 |
| 2,701,622 | Hodson | Feb. 8, 1955 |
| 2,723,842 | Hall | Nov. 15, 1955 |